United States Patent
Asbach et al.

(10) Patent No.: US 8,381,848 B2
(45) Date of Patent: Feb. 26, 2013

(54) CHILDREN'S RIDE-ON VEHICLES WITH WINDOW MECHANISMS

(75) Inventors: Ronald M. Asbach, Grand Island, NY (US); David M. Bapst, South Wales, NY (US); Kurt J. Huntsberger, Arcade, NY (US); Jacob J. Clark, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 13/356,863

(22) Filed: Jan. 24, 2012

(65) Prior Publication Data

US 2012/0118651 A1    May 17, 2012

Related U.S. Application Data

(63) Continuation of application No. 11/900,869, filed on Sep. 12, 2007, now Pat. No. 8,109,352, which is a continuation-in-part of application No. 11/789,780, filed on Apr. 24, 2007, now Pat. No. 7,967,089.

(51) Int. Cl.
  *B60J 1/17*    (2006.01)
(52) U.S. Cl. .............................. 180/65.1; 49/349; 49/362
(58) Field of Classification Search ................ 180/65.1, 180/65.31; 49/348, 349, 350, 360, 361, 362
  See application file for complete search history.

(56) References Cited

U.S. PATENT DOCUMENTS

| | | | | |
|---|---|---|---|---|
| 2,219,527 | A | * | 10/1940 | Mommer et al. ............... 49/349 |
| 2,336,530 | A | * | 12/1943 | Chandler et al. ............... 49/349 |
| 4,222,202 | A | | 9/1980 | Pigeon |
| 4,417,419 | A | * | 11/1983 | Rossie et al. ................... 49/348 |
| 4,930,255 | A | * | 6/1990 | Sea .................................. 49/63 |
| 4,939,867 | A | | 7/1990 | Harada et al. |
| 4,967,510 | A | | 11/1990 | Torii et al. |
| 5,076,014 | A | | 12/1991 | Cuyl |
| 5,080,272 | A | | 1/1992 | Buschmann et al. |
| 5,142,824 | A | * | 9/1992 | Le Compagnon et al. ..... 49/349 |
| 5,309,677 | A | | 5/1994 | Kunert et al. |
| 5,309,678 | A | | 5/1994 | Adachi |
| 5,505,022 | A | | 4/1996 | Shibata et al. |
| 5,537,782 | A | * | 7/1996 | Klippert et al. ................. 49/358 |
| 5,653,144 | A | * | 8/1997 | Fenelon ........................ 74/411 |
| 5,657,580 | A | | 8/1997 | Kobrehel |
| 5,787,644 | A | * | 8/1998 | Thomsen, Jr. .................. 49/351 |
| 5,799,441 | A | | 9/1998 | Shibata |
| 5,806,244 | A | * | 9/1998 | Tilli ............................... 49/358 |
| 5,946,857 | A | * | 9/1999 | Davies et al. ................... 49/260 |
| 6,006,473 | A | | 12/1999 | Mariel et al. |
| 6,035,579 | A | * | 3/2000 | Staser et al. .................... 49/351 |
| 6,061,963 | A | | 5/2000 | Osborn et al. |

(Continued)

OTHER PUBLICATIONS

International Search Report and Written Opinion for Application No. PCT/US08/60122, Aug. 18, 2008.

*Primary Examiner* — Jeffrey J Restifo
(74) *Attorney, Agent, or Firm* — DASCENZO Intellectual Property Law, P.C.

(57) ABSTRACT

Children's ride-on vehicles having window mechanisms, and window mechanisms for such vehicles. In some embodiments, the window mechanism is a manual window mechanism, and in some embodiments the window mechanism is a powered, or motorized, window mechanism. The window mechanism includes a window drive assembly that selectively drives movement of a window member relative to the vehicle body. In some embodiments, the window drive assembly is a powered window drive assembly that includes a window motor assembly and a window linkage to couple the output of the window motor assembly to the window member. In some embodiments, the window drive assembly is a manual window drive assembly. In some embodiments, the window member includes a receiving region coupled to the window linkage. In some embodiments, the window mechanism includes a window support assembly that maintains the window member in a predetermined orientation relative to the vehicle body.

20 Claims, 9 Drawing Sheets

U.S. PATENT DOCUMENTS

| | | | |
|---|---|---|---|
| 6,073,395 A * | 6/2000 | Fenelon | 49/358 |
| 6,119,400 A | 9/2000 | Ovenshire | |
| 6,216,394 B1 * | 4/2001 | Fenelon | 49/349 |
| 6,389,753 B1 * | 5/2002 | Fenelon | 49/348 |
| 6,405,817 B1 * | 6/2002 | Huntsberger et al. | 180/65.1 |
| 6,408,967 B1 * | 6/2002 | Huntsberger et al. | 180/65.1 |
| 6,425,208 B1 * | 7/2002 | Klueger et al. | 49/502 |
| 6,430,874 B1 * | 8/2002 | Korte | 49/358 |
| 6,435,293 B1 * | 8/2002 | Williams | 180/65.1 |
| 6,446,696 B1 * | 9/2002 | Davies et al. | 160/243 |
| 6,470,982 B2 * | 10/2002 | Sitarski et al. | 180/65.1 |
| 6,508,320 B2 * | 1/2003 | Huntsberger et al. | 180/65.1 |
| 6,508,322 B2 * | 1/2003 | Dignitti et al. | 180/68.5 |
| 6,560,929 B1 * | 5/2003 | Staser et al. | 49/362 |
| 6,631,586 B1 * | 10/2003 | Nakagomi et al. | 49/349 |
| 6,655,092 B2 * | 12/2003 | Pacella et al. | 49/506 |
| 6,656,010 B1 * | 12/2003 | Bienz et al. | 446/431 |
| 6,679,002 B2 * | 1/2004 | Davies et al. | 49/360 |
| 6,755,265 B2 * | 6/2004 | Huntsberger et al. | 180/65.1 |
| 6,771,034 B2 * | 8/2004 | Reile et al. | 318/139 |
| 6,779,307 B2 * | 8/2004 | Dobson | 49/349 |
| 6,820,369 B2 * | 11/2004 | Fenelon | 49/349 |
| 6,966,149 B2 * | 11/2005 | Fenelon | 49/375 |
| 6,973,987 B2 * | 12/2005 | Damon | 180/68.5 |
| 6,994,179 B2 * | 2/2006 | Huntsberger et al. | 180/65.22 |
| 7,007,767 B2 * | 3/2006 | Damon | 180/68.5 |
| 7,140,151 B2 * | 11/2006 | Spaziani et al. | 49/349 |
| 7,413,041 B2 * | 8/2008 | Drosendahl et al. | 180/65.1 |
| 7,509,773 B2 * | 3/2009 | Vornbaumen et al. | 49/362 |
| 7,513,324 B2 * | 4/2009 | Bergum et al. | 180/65.1 |
| 7,530,411 B2 * | 5/2009 | Huntsberger et al. | 180/65.1 |
| 7,536,927 B2 * | 5/2009 | Fleytman | 74/89.17 |
| 7,568,538 B2 * | 8/2009 | Drosendahl et al. | 180/65.1 |
| 7,726,074 B2 | 6/2010 | Kollner et al. | |
| 7,967,089 B2 | 6/2011 | Asbach et al. | |
| 2002/0104695 A1 | 8/2002 | Sitarski et al. | |
| 2002/0162280 A1 | 11/2002 | Shah | |
| 2004/0003544 A1 | 1/2004 | Berry et al. | |
| 2004/0111970 A1 | 6/2004 | Fenelon | |
| 2005/0160675 A1 | 7/2005 | Fenelon | |
| 2005/0287923 A1 | 12/2005 | Haney | |
| 2005/0287924 A1 | 12/2005 | Haney | |
| 2006/0064934 A1 | 3/2006 | Vornbaumen et al. | |
| 2008/0264703 A1 * | 10/2008 | Asbach et al. | 180/65.1 |
| 2009/0145034 A1 | 6/2009 | Isomura | |

* cited by examiner

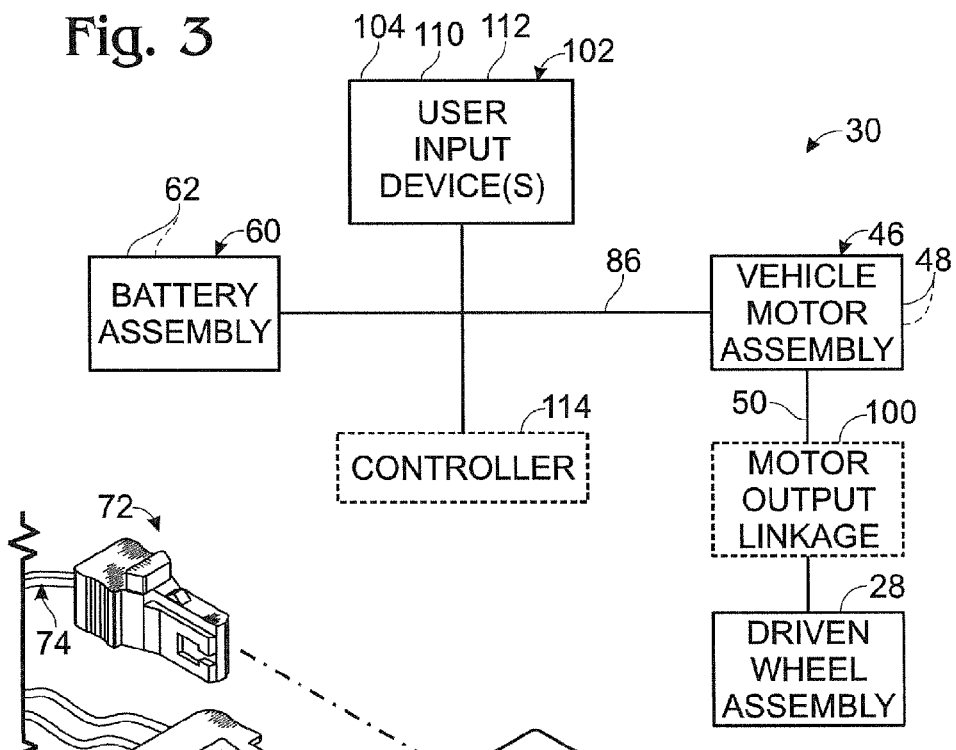
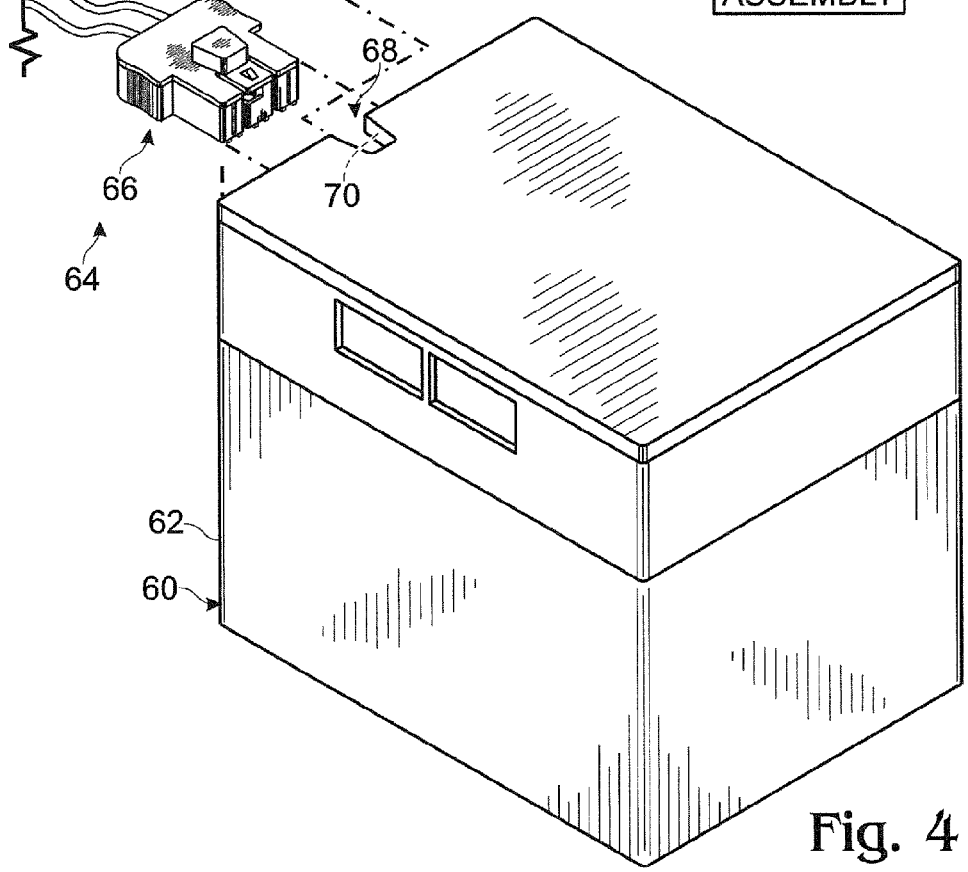

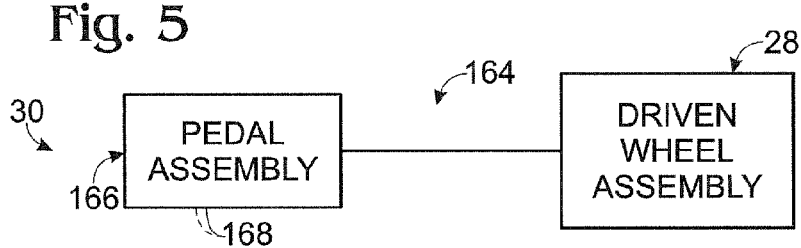
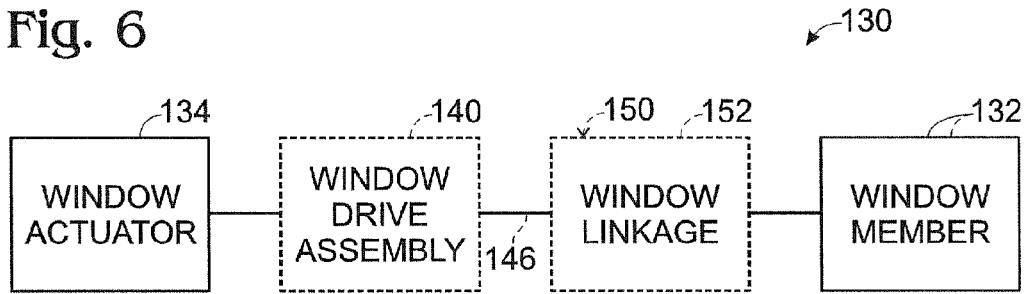
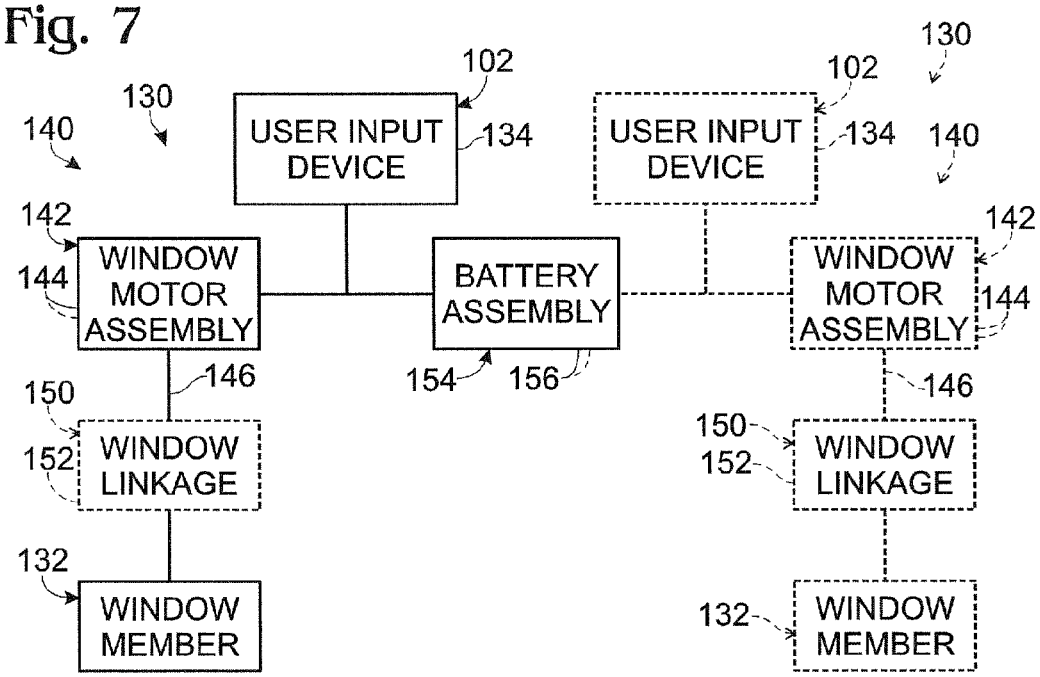

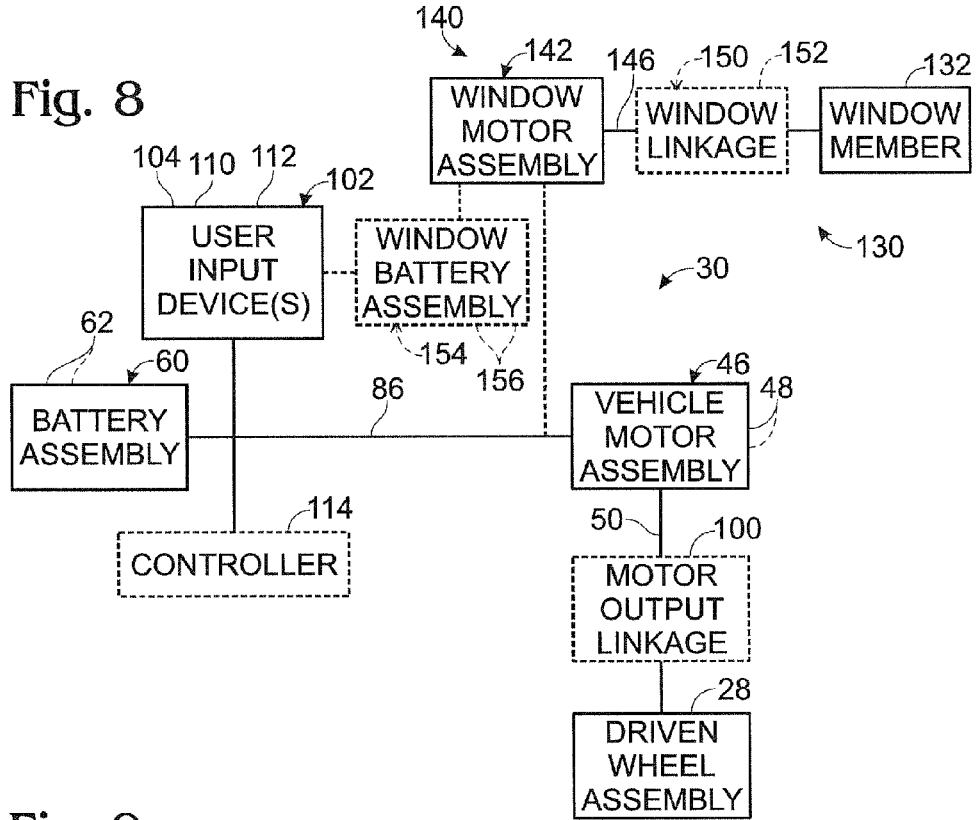
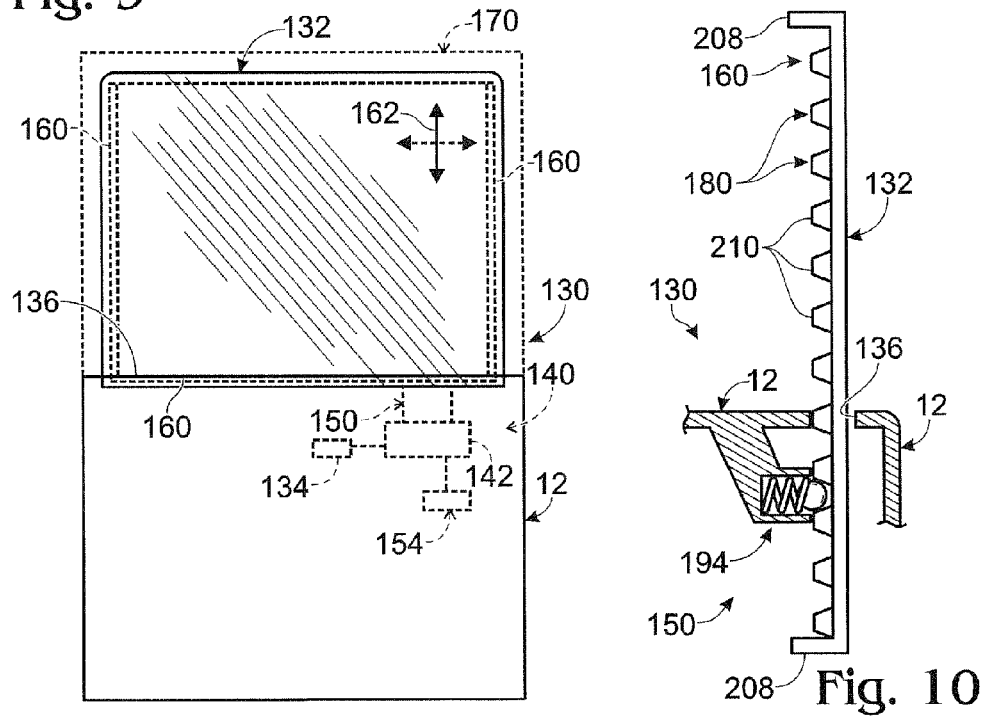

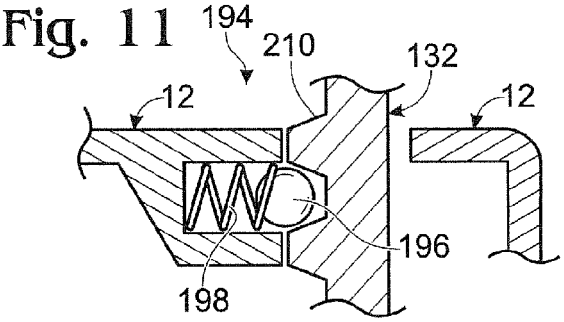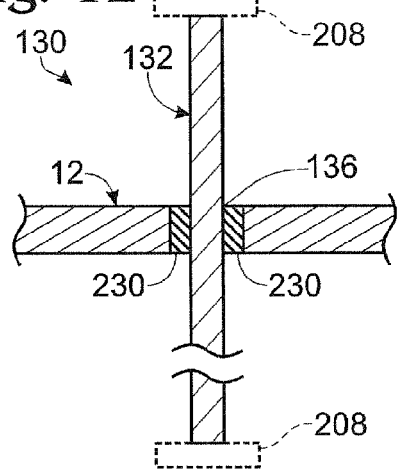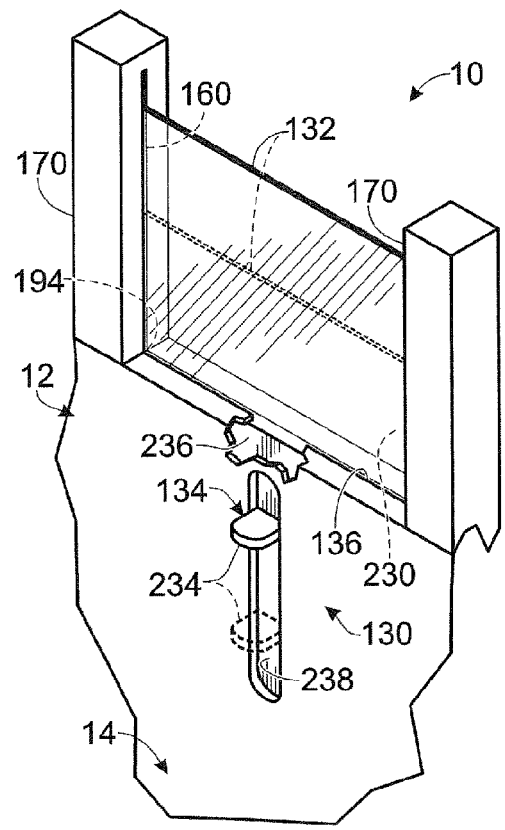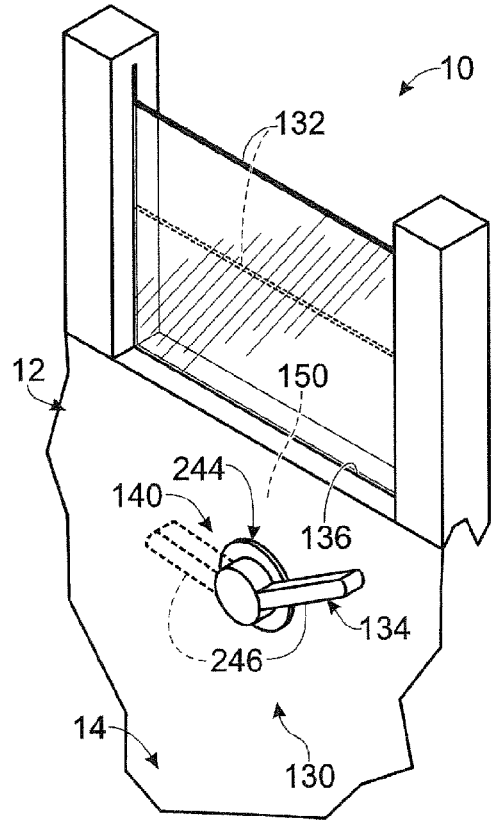

CHILDREN'S RIDE-ON VEHICLES WITH WINDOW MECHANISMS

RELATED APPLICATIONS

The present application is a continuation patent application that claims priority under U.S.C. §120 to U.S. patent application Ser. No. 11/900,869, which is entitled "Children's Ride-On Vehicles with Window Mechanisms," and which was filed on Sep. 12, 2007. U.S. patent application Ser. No. 11/900,869 is a continuation-in-part of, and claims priority to, U.S. patent application Ser. No. 11/789,780, which is entitled "Children's Ride-On Vehicles with Powered Window Mechanisms," which was filed on Apr. 24, 2007, and which issued on Jun. 28, 2011 as U.S. Pat. No. 7,967,089. The complete disclosures of the above-identified patent applications are hereby incorporated by reference.

TECHNICAL FIELD

The present disclosure relates generally to children's ride-on vehicles, and more particularly to battery-powered children's ride-on vehicles with window mechanisms.

BACKGROUND OF THE DISCLOSURE

Children's ride-on vehicles are reduced-scale vehicles that are designed for use by children. For example, children's ride-on vehicles include at least one seat adapted to accommodate one or more children and steering and drive assemblies that are adapted to be operated by a child sitting on the seat. One type of drive assembly that is often used in children's ride-on vehicles includes a battery-powered vehicle motor assembly that is adapted to drive the rotation of one or more of the vehicle's wheels, such as responsive to inputs from the child sitting on the seat. The vehicle motor assembly is powered by a battery assembly, which may include one or more rechargeable batteries. Typically, the vehicle will include an actuator, such as a foot pedal, push button, or other user input device, which enables a child to select when power is delivered to the vehicle motor assembly. Some vehicle drive assemblies further include other user input devices, such as a speed selector and/or a direction selector, which are operated by a child sitting on the vehicle's seat to select the speed and direction at which the vehicle travels.

Children enjoy imitating adult activities and consequently enjoy ride-on vehicles that resemble full-scale vehicles, including full-scale vehicle functionality. However, conventional children's ride-on vehicles typically lack windows, much less movable windows that more closely resemble full-scale vehicles.

BRIEF DESCRIPTION OF THE DRAWINGS

FIG. 3 is a schematic diagram of a powered drive assembly for a children's ride-on vehicle according to the present disclosure, such as the vehicle of FIG. 1.

FIG. 4 is a perspective view of an illustrative example of a battery assembly suitable for use with the drive assembly of FIG. 3, with portions of the vehicle's wiring harness and charger shown in fragment.

FIG. 5 is a schematic diagram of another suitable drive assembly for a children's ride-on vehicle according to the present disclosure, such as the vehicle of FIG. 1.

FIG. 6 is a schematic diagram of an illustrative, non-exclusive example of a window mechanism according to the present disclosure.

FIG. 7 is a schematic diagram of an illustrative, non-exclusive example of a powered window mechanism of a children's ride-on vehicle.

FIG. 8 is a schematic diagram of an illustrative, non-exclusive example of a powered window mechanism of a children's ride-on vehicle combined with the vehicle drive assembly of FIG. 3.

FIG. 9 is a schematic diagram of an illustrative example of a portion of a ride-on vehicle with a window mechanism according to the present disclosure.

FIG. 10 is a fragmentary, partial cross-sectional side elevation view of an illustrative, non-exclusive example of a window mechanism according to the present disclosure.

FIG. 11 is a fragmentary, cross-sectional side elevation view of the coupling assembly of the window mechanism of FIG. 10.

FIG. 12 is a fragmentary, partial cross-sectional side elevation view of another illustrative, non-exclusive example of a window mechanism according to the present disclosure.

FIG. 13 is a fragmentary isometric view of a portion of a children's ride-on vehicle with an illustrative, non-exclusive example of a window mechanism according to the present disclosure.

FIG. 14 is a fragmentary isometric view of a portion of a children's ride-on vehicle with another illustrative, non-exclusive example of a window mechanism according to the present disclosure.

DETAILED DESCRIPTION AND BEST MODE OF THE DISCLOSURE

Figure 1:
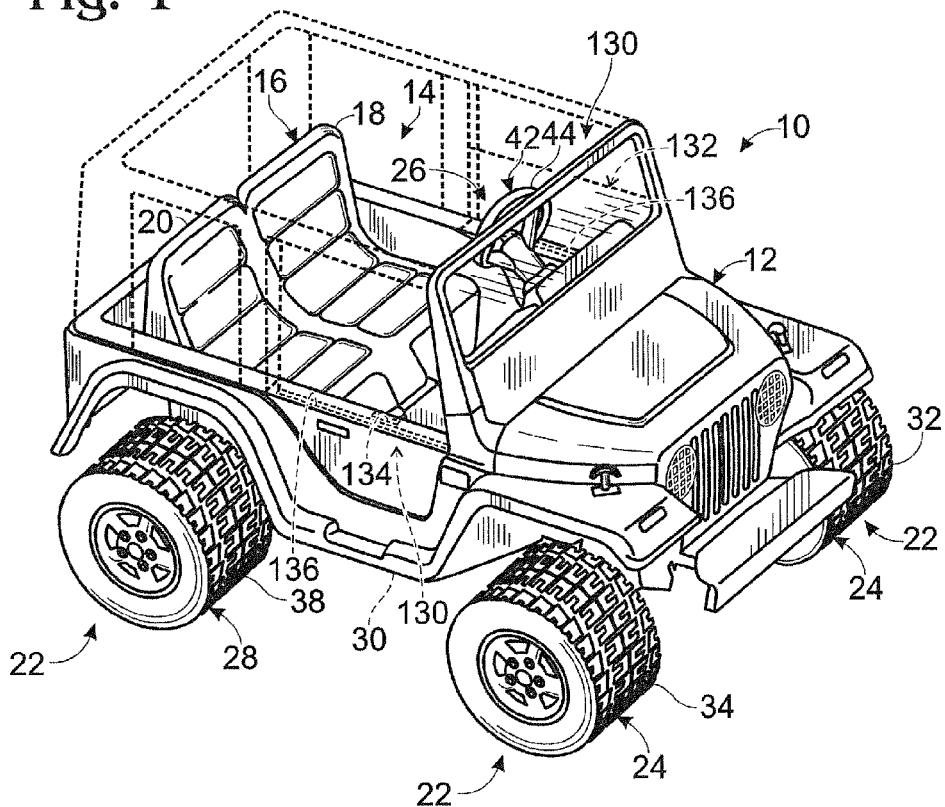
FIG. 1 is an isometric view of an illustrative, non-exclusive example of a children's ride-on vehicle according to the present disclosure, with the vehicle including a window mechanism for moving a window member relative to a vehicle body.

An illustrative, non-exclusive example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips, and/or other suitable fasteners. Body 12 may additionally, or alternatively, be at least partially formed from other suitable material(s), such as metal, wood, and/or composite materials. Body 12 may include, or be mounted upon, an underlying chassis, or chassis portion, on which the rest of the body (which may be referred to as a body portion) is supported. The chassis portion may be formed from the same or different materials as the rest of the body. When present, the chassis portion is often formed of metal and/or molded plastic, with the rest of the body often being formed of molded plastic. However, these illustrative examples of suitable materials of construction are not required.

As shown, body 12 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft, and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10, including the subsequently described window mechanisms, may be configured for use on any type of children's ride-on vehicle having one or more manual or electrically powered components.

Figure 2:
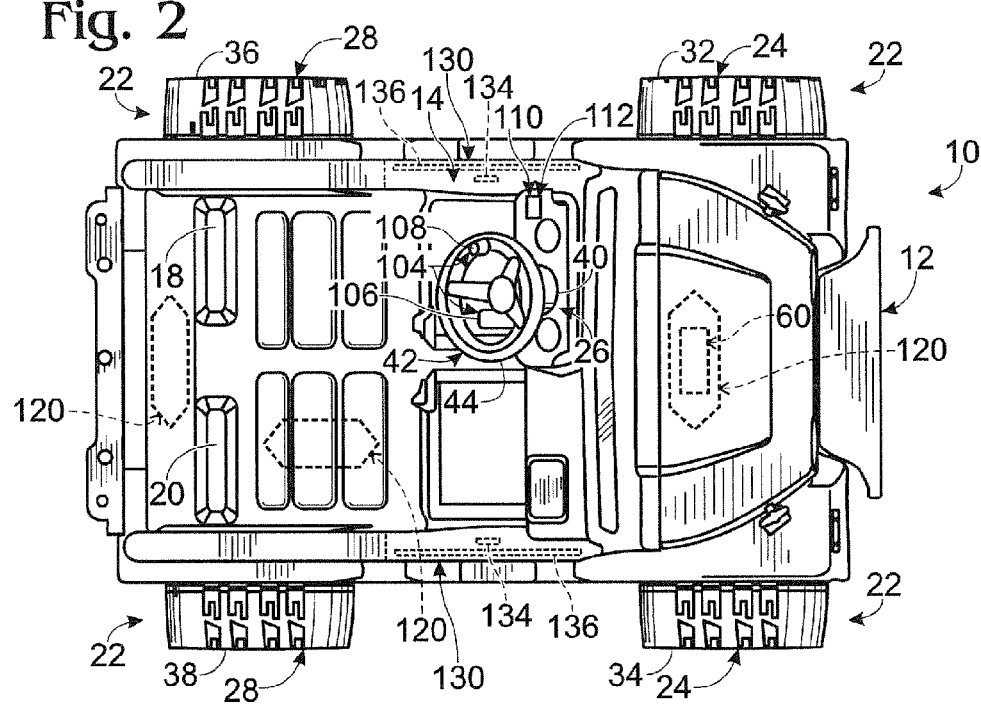
FIG. 2 is a top plan view of the vehicle of FIG. 1.

Ride-on vehicle 10 also includes a plurality of wheels 22 that are rotatably coupled to body 12 and adapted to contact a ground surface, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of a manual assembly, such as pedals, by a motor assembly, or conveyed to the wheel from a manual assembly or a motor assembly through a linkage, such as a gearbox, belt, chain, gear assembly, axle, or the like.

In the illustrated, non-exclusive example, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel of the plurality of wheels, and a particular wheel may form all or a portion of the steerable wheel assembly and/or the driven wheel assembly. For example, it is within the scope of the disclosure that either or both of front wheels 32 and 34 or rear wheels 36 and 38 are driven and/or steerable. Similarly, one front wheel and one rear wheel may be driven and/or steerable. Additionally or alternatively, the vehicle may include one or more driven and/or steerable wheels underneath its body that are generally hidden by, or housed within, the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers, may be used and are within the scope of the present disclosure. Steering column 40 includes any suitable mechanical linkage that conveys a child's steering inputs from the steering mechanism to the vehicle's steerable wheel assembly, thereby steering the vehicle. The steering column may also be referred to as a steering shaft. As an illustrative, non-exclusive example, the steering column may include an end portion distal the steering mechanism, with this end portion being coupled via a suitable tie rod or steering linkage, to steering collars, or steering levers, associated with one or more steerable wheels of the ride-on vehicle's steerable wheel assembly.

In FIG. 3, a non-exclusive example of a suitable vehicle drive assembly 30 for a powered children's ride-on vehicle, such as vehicle 10, is schematically illustrated. Vehicle drive assembly 30 is adapted to drive the rotation of driven wheel assembly 28. The vehicle drive assembly includes a vehicle motor assembly 46, which includes at least one electric motor 48 that is adapted to drive the rotation of at least one of the driven wheels of the plurality of wheels. The vehicle motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when vehicle motor assembly 46 includes more than one motor and/or when driven wheel assembly 28 includes more than one driven wheel. Illustrative, non-exclusive examples of suitable motors are disclosed in U.S. Patent Application Publication No. 2006/0175101, the complete disclosure of which is hereby incorporated by reference for all purposes. Vehicle motor assembly 46 also may be configured to drive other moveable components on vehicle 10, such as depending on the form of the vehicle. For example, the vehicle motor assembly may be coupled to raise and lower the blade of a ride-on that resembles a bulldozer, the bucket of a ride-on that resembles a skid-steer or other loader, the bed of a ride-on that resembles a dump truck, etc.

Power for the vehicle motor assembly, such as the illustrative, non-exclusive example of a vehicle motor assembly shown in FIG. 3, may be provided by any suitable power source. An illustrative example of a suitable power source is a battery assembly 60. Battery assembly 60 includes at least one battery 62 that is adapted to provide power to the vehicle motor assembly. Any suitable type and number of batteries may be used in battery assembly 60. Although not required, the batteries may be rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 that is adapted to transmit power from the battery assembly to the vehicle motor assembly by providing an electrical connection between the battery assembly and the vehicle motor assembly, typically through the vehicle's wiring harness. Thus, the vehicle motor assembly is operably connected to the battery assembly by any suitable electrical connectors, such as cables, wires, or positive and negative terminals or leads, and the like.

In the illustrative battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from the battery assembly to the motor assembly, with the battery assembly of FIG. 4 merely providing an illustrative example. For example, the battery assembly may include one or more batteries that include a connector that extends, typically via a wired connection, from the battery's housing instead of the internal socket 68 depicted in FIG. 4. Illustrative, non-exclusive examples of suitable batteries for children's ride-on vehicles are disclosed in U.S. Pat. No. 6,509,719, the complete disclosure of which is hereby incorporated by reference for all purposes.

In FIG. 3, vehicle drive assembly 30 is shown further including an optional motor output linkage 100 that mechanically interconnects the vehicle motor assembly with the driven wheel assembly. Motor output linkage 100 is any suitable mechanism that transmits the rotational input from the vehicle motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the vehicle motor assembly to the driven wheel assembly at the same relative rate of rotation, or it may mechanically augment the rotational input to convey a greater or lesser rate of rotation relative to the rate of rotation of the output of the vehicle motor assembly. It is also within the scope of the disclosure that vehicle drive assembly 30 may be formed without motor output linkage 100, in which case the output(s) 50 of the vehicle motor assembly directly transmits the rotational input to the driven wheel assembly.

Vehicle drive assembly 30 also includes one or more user input devices 102 that are adapted to convey inputs from a child sitting on the vehicle's seat, such as seat 18, to the vehicle drive assembly. User input devices 102 also may be referred to as user control devices. These devices convey a user's inputs, such as via the vehicle's wiring harness 86. An illustrative example of a user input device is a drive actuator 104, which is adapted to selectively energize the vehicle motor assembly responsive to a user, such as a child sitting on the vehicle's seat, manipulating, or otherwise actuating the input device. In other words, drive actuator 104 is adapted to receive a user input directing the battery assembly to actuate or otherwise energize the vehicle motor assembly, such as to cause the ride-on vehicle to be in an energized drive configuration instead of a de-energized drive configuration. Illustrative examples of suitable drive actuators 104 include an on/off switch, a foot pedal, a throttle lever, and a rotational handgrip on a steering mechanism that includes a handlebar.

In FIG. 2, an example of a drive actuator 104 is shown in the form of a foot pedal 106 positioned for actuation by a child sitting on seat 18. When the drive actuator takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2. Although a pair of drive actuators is illustrated in FIG. 2, the vehicle drive assembly will often only include a single drive actuator. The drive actuators may enable a user to select within a range of actuations/speeds (such as with a throttle), or simply to select whether or not the vehicle motor assembly is energized, such as with an on/off switch.

The user inputs, such as conveyed via user input device(s) 102, also may be adapted to select, or configure, the vehicle drive assembly within a plurality of drive configurations. These user inputs may be referred to as configuration inputs and are adapted to enable, or select, one or more of a plurality of drive configurations. Similarly, the user input devices utilized to receive the configuration inputs from a user, such as a child sitting on the ride-on vehicle's seat, may be referred to as configuration input devices. These drive configurations may be realized, or implemented, when the vehicle motor assembly is energized, such as responsive to actuation/energization of the vehicle motor assembly by the battery assembly. For example, the plurality of drive configurations may include one or more of the direction (forward or reverse) in which the vehicle drive assembly will propel the vehicle upon energization of the vehicle motor assembly, the relative speed or range of speed which the vehicle motor assembly is configured/energized to provide, and/or whether the vehicle drive assembly is able to be actuated responsive to an actuation input to a drive actuator 104.

For example, speed drive configurations, such as "high" and "low" speed configurations, "high," "medium," and "low" speed configurations, etc., may be selected with one or more user input devices 102 in the form of a speed switch 110. These speed drive configurations may be realized (i.e., the vehicle may be propelled according to the selected speed drive configuration) upon actuation or energization of the motor assembly. As the illustrative descriptions used above imply, the speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by a user input device in the form of a direction switch 112, which enables a user to select the relative direction (i.e., clockwise or counterclockwise) of rotation of output(s) 50 and thereby configure the vehicle to drive in forward and reverse directions upon energization of the vehicle motor assembly. Actuator 104, and switches 108, 110, and 112 (when present) may be located in any suitable location on body 12 and/or steering assembly 26. Preferably, the switches or other user input devices are positioned for actuation by a child sitting on seat 18. Illustrative (non-exclusive) examples of suitable positions are shown in FIG. 2. Illustrative, non-exclusive examples of combined speed and direction switches that take the form of shifters are disclosed in U.S. Pat. No. 5,644,114 and in U.S. patent application Ser. No. 11/410,568, the complete disclosures of which are hereby incorporated for reference for all purposes.

A further example of drive configurations may be referred to as power configurations and relate to whether or not the vehicle drive assembly's motor assembly is in an energized state, in which the vehicle motor assembly is driving the rotation of the driven wheel assembly, or a de-energized state, in which the vehicle motor assembly is not driving the rotation of the driven wheel assembly. In other words, when in the de-energized drive configuration, the vehicle motor assembly does not drive the rotation of the ride-on vehicle's driven wheel assembly. As an illustrative example, the vehicle drive assembly may be selectively configured from a de-energized drive configuration to an energized drive configuration responsive to a user, such as a child sitting on a seat of the ride-on vehicle, actuating drive actuator 104. As discussed, this may (but is not required in all embodiments to) include pressing or otherwise manipulating a throttle lever or button, or depressing a foot pedal.

The vehicle drive assembly may include any suitable structure to selectively enable the plurality of drive configurations. For example, switching between forward and reverse drive configurations may be implemented by reversing the polarity of the battery assembly relative to the motor assembly. As another example, relative speed configurations may be achieved by switching two or more batteries and/or two or more motors between series and parallel configurations. As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation or other duty cycle ramping of the energization of the motor assembly.

It is within the scope of the present disclosure that the plurality of drive configurations may include other configurations than the illustrative examples described herein. Similarly, the vehicle drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneously with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

As shown in FIG. 3, vehicle drive assembly 30 may (but is not required to) further include a controller 114, which controls the operation of the vehicle drive assembly responsive to at least one of received user inputs and predetermined programming. As an illustrative example, controller 114 may be adapted to control electronically the transmission of a user-selected speed to the driven wheel assembly and/or to configure the vehicle drive assembly to the user-selected drive configuration. Controller 114 may include a microprocessor or suitable control circuit. In the context of configuring the vehicle drive assembly to a selected drive configuration, the controller may be adapted to selectively enable or disable selected ones of the plurality of drive configurations responsive to user inputs, such as via user input devices 102, predetermined programming, and/or inputs from other sensors or switches.

When controller 114 is adapted to regulate the energization of the vehicle motor assembly, it may regulate electronically the rotational input transmitted by the vehicle motor assembly to the driven wheel assembly. For example, controller 114 may regulate at least one of the timing and the ramp, or rate, of application of the transmission of the rotational input after actuation of a corresponding user input device by a child sitting on seat 18. In other words, the controller may be configured to delay in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

It is also within the scope of the present disclosure that controller 114 may selectively control the transmission of the selected rotational input (such as determined by the selected speed configuration and/or actuation input). By this it is meant that the controller may be configured to control the transmission of the selected rotational input in certain situations, such as when certain parameters or thresholds are satisfied. For example, controller 114 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), or when the ride-on vehicle changes direction.

As shown in FIG. 2, body 12 also includes a battery compartment 120 that is adapted to receive battery assembly 60. The battery compartment may take any of a variety of different shapes, sizes, configurations, and locations depending on such factors as the form of vehicle 10, the portion of the vehicle's body within which the compartment is formed, and the size and shape of battery assembly 60.

Children's ride-on vehicles according to the present disclosure may additionally or alternatively include a vehicle drive assembly 30 in the form of a manual vehicle drive assembly. As an illustrative example, a manual vehicle drive assembly may include a pedal assembly having pedals that are coupled to at least one of the plurality of wheels so that the at least one wheel is rotationally driven as a child seated in the vehicle passenger compartment moves the pedals. An illustrative, non-exclusive example of a pedal-powered vehicle drive assembly is schematically illustrated in FIG. 5 at 164. Pedal-powered drive assembly 164 is adapted to drive the rotation of driven wheel assembly 28. Assembly 164 is operatively coupled to the driven wheel assembly and includes a pedal assembly 166 having pedals 168. Rotation of the pedals drives rotation of the driven wheel assembly. An additional illustrative example of a suitable pedal assembly is disclosed in U.S. Pat. No. 6,651,528, the complete disclosure of which is incorporated herein by reference for all purposes. It is also within the scope of the present disclosure that children's ride-on vehicles having window mechanisms according to the present disclosure may be formed without a drive assembly and therefore may be adapted to be propelled by a child seated on seat 18 pushing the vehicle with the child's feet in a foot-to-floor manner (and/or by coasting downhill), and/or by an adult who pushes the vehicle via any suitable mechanism, among others.

Ride-on vehicle 10 also includes a window mechanism 130. A portion of the window mechanism is shown in FIGS. 1 and 2 and includes a movable window member 132. The window member may be formed from any suitable material, including, but not limited to, glass and plastics, and may (but is not required to) be clear or opaque. The window member may be manually movable or may be configured to be moved by electrically powered components. In some embodiments, the window mechanism includes a window actuator 134 that enables a child occupying seat assembly 16 to selectively move the window member relative to body 12. The window actuator may take any suitable form, such as a crank, a switch, a lever, a handle, a dial, and the like. The window actuator may be located within or near passenger compartment 14 so that a child sitting on seat assembly 16 may reach the actuator. As illustrative, non-exclusive examples, a window actuator may be located on the body of the ride-on, may extend from the body of the ride-on, may extend from the window member, etc.

Body 12 includes an opening 136 to accommodate movement of the window member relative to the body, such as responsive to user inputs to the window actuator. For example, the window member may be configured to extend through the opening as the window member is actuated between a closed position and an open position. In some embodiments, this movement may be described as movement between a retracted configuration, in which the window member is at least partially, if not completely, positioned within the body of the ride-on, and an extended configuration, in which the window member extends from the body, such as through opening 136, to a greater extent than when the window member is in the retracted configuration. The window member may be positioned in any suitable location of the body, such as a window within a side door portion, a sunroof within an upper body portion, a rear window within a hatchback door portion, and the like.

In some embodiments, the window member may replace a portion, or member, of the vehicle body, such as to allow a child to enter the vehicle or place items in the vehicle, including, but not limited to, a sliding door, a movable hatchback portion, a tailgate, and the like. In such embodiments, window mechanism 130 may be referred to as a body mechanism 130. The corresponding components thereof may be similarly referred to as components of the body mechanism. For example, window member 132 may be referred to as a movable body member 132, and the subsequently discussed window drive assembly, window motor assembly, and window actuator may respectively be referred to as a body member drive assembly, a body member actuator, and a body member motor assembly.

Although a pair of window actuators are illustrated in FIG. 2 to accommodate a driver and a passenger, a single window actuator may be used. The window mechanism 130 of a ride-on vehicle 10 according to the present disclosure may include one or more window members, with the one or more window members actuated together by a single actuator 134 or actuated independently by an actuator for each window member. Similarly, ride-on vehicle 10 may include one or more window mechanisms 130. For example, the ride-on vehicle may include a pair of window mechanisms, such as for a driver side window and a passenger side window, a side window and a sunroof, a window and a tailgate, and the like. It is further within the scope of the present disclosure that a ride-on vehicle 10 may include three or more window mechanisms 130, such as for two side windows and a sunroof, rear window, tailgate, or hatchback.

FIG. 6 provides a schematic illustration of a window mechanism 130 according to the present disclosure. As shown, window mechanism 130 includes at least one window member 132 and a window actuator 134 that is selectively manipulated or otherwise actuated by a user, such as a child sitting on a seat of the ride-on vehicle, to initiate the movement of the window member relative to the body of the ride-on vehicle. Window mechanism 130 may include a window drive assembly 140 that is adapted to drive movement of the window member relative to the body of the ride-on, such as responsive to user inputs and/or user-applied forces to the window actuator. As discussed, this movement may include selectively extending or retracting the window member relative to an opening in the body of the ride-on vehicle. As more specific, non-exclusive examples, the window member may be moved vertically, such as towards the top and bottom of the body, or horizontally, such as towards the front and back of the body, and/or configured to rotate relative to the body, such as to open and close a pivotable sunroof, tailgate, or hatchback.

The window drive assembly may be implemented in manual and powered embodiments. As used herein in the context of the window drive assembly, the term "powered" refers to electrically powered window drive assemblies. A manual window drive assembly utilizes user-applied forces to the window actuator to propel the movement of the window member. In other words, in a manual window drive assembly, the user is providing the motive force to propel the movement of the window member. In contrast, in a powered window drive assembly, the window drive assembly includes at least one window motor assembly that drives the movement of the window member when the motor assembly is energized by a battery or other suitable power source. The window motor assembly is selectively energized by user inputs to the window actuator.

The window drive assembly may be described as having an output 146, which in the case of a manual window drive assembly refers to the motive force applied by the user and conveyed directly or indirectly to the window member, and in the case of a powered window drive assembly refers to the rotational output of the motor assembly. Window mechanisms 130 that include a manual window drive assembly may be referred to herein as manual window mechanisms, and window mechanisms 130 that include a powered window drive assembly may be referred to herein as powered window mechanisms.

As discussed above, the window actuator may take a variety of forms. It follows that the particular structure and configuration of the window actuator may vary depending upon factors that include whether the window drive assembly is a manual window drive assembly or a powered window drive assembly. As illustrative, non-exclusive examples, when the window drive assembly is a manual window drive assembly, the window actuator may take such non-exclusive forms as a handle attached to the window member, a lever that is directly or indirectly coupled to the window member, a dial or crank that is directly or indirectly coupled to the window member, etc. When the window drive assembly is a powered window drive assembly, the window actuator may take such illustrative, non-exclusive forms as a button, toggle, or switch that selectively energizes the motor assembly responsive to user inputs thereto.

It is within the scope of the present disclosure that a manual window drive assembly may be utilized with a children's ride-on vehicle that includes either a powered or manual vehicle drive assembly. Similarly, a powered window drive assembly may be utilized with a children's ride-on vehicle that includes either a powered or a manual vehicle drive assembly.

In FIG. 6, window mechanism 130 is shown further including an optional window linkage 150. When present, window linkage 150 is configured or otherwise adapted to transmit forces from the window actuator and/or from the window drive assembly to the window member. In some embodiments, the window linkage may be described as coupling the output of the window drive assembly to the window member. When present in a manual window mechanism, the window linkage may mechanically interconnect the window actuator with the window member to transmit user-applied motive forces to the window member. As another illustrative, non-exclusive example, in a manual window mechanism, the window linkage may mechanically interconnect the output of the manual window drive assembly with the window member. When present in a powered window mechanism, the window linkage may mechanically interconnect the output of the window motor assembly with the window member.

Window linkage 150 may include any suitable structure and/or utilize any suitable mechanism that transmits the applied forces from the window actuator and/or output of the window drive assembly to the window member. Illustrative, non-exclusive examples of suitable window linkages include a gearbox containing one or more gears, a worm gear, one or more individual gears, a belt or chain drive, one or more elastic members, one or more intermediate shafts or members, and the like. The window linkage may be adapted to transmit the input from the window drive assembly to the window member at the same relative rate of rotation or other movement, or it may mechanically augment the input to convey a greater or lesser rate of movement relative to the rate of movement of the output of the window drive assembly.

As discussed, it is not required for all window mechanisms according to the present disclosure to include a window linkage. For example, in some manual configurations of window mechanism 130, user inputs may be directly transmitted to the window member, such as by a child or other user, such as a child sitting in the vehicle's passenger compartment, pulling or pushing the window member relative to the body. As another example, in some powered configurations of window mechanism 130, window drive assembly 140 may be formed without window linkage 150, in which case the output(s) 146 of the window motor assembly directly transmit the input to the window member.

As indicated in FIG. 6, the window linkage, when present, may further include a clutch assembly 152 that selectively disconnects, or uncouples, the window member for relative movement with respect to the body of the ride-on vehicle. The clutch assembly may be described as being selectively configured between a coupled configuration and an uncoupled configuration. When the clutch assembly is in the coupled configuration, forces from the window actuator or window drive assembly are conveyed to the window member, and vice versa, without the clutch assembly interfering with this transfer of force. However, when the clutch assembly is in the uncoupled configuration, then the clutch assembly interrupts, or prevents, the transfer of forces from the window actuator and/or window drive assembly to the window member, and vice versa.

When present, the clutch assembly may be biased to the coupled configuration by any suitable biasing assembly. In such a configuration, the transfer of forces to or from the window mechanism will not be interrupted by the clutch assembly unless forces applied to the clutch assembly exceed a predetermined threshold force, such as the force applied by the biasing assembly. For example, the clutch assembly may permit movement of the window member and the output of the window drive assembly to not be synchronized (i.e., to configure window linkage to a disengaged configuration) to limit potential damage to the window mechanism when forces are applied thereto that exceed a predetermined threshold. These forces may be encountered in such illustrative, non-exclusive situations as when the window drive assembly is still being actuated to move the window member but a child is pulling or pushing on the window member in an opposite direction or at a different rate and/or when the movement of the window member is obstructed but the window drive assembly is actuated to drive continued movement of the window member in the direction of the obstruction.

As discussed, in powered window mechanisms, movement of the window member is driven by window drive assembly 140. In other words, window actuator 134 is adapted to selectively energize the window motor assembly responsive to a user, such as a child sitting on the vehicle's seat, manipulating, or otherwise actuating, the input device. In FIG. 7, an illustrative, non-exclusive example of a suitable powered window mechanism 130 for a children's ride-on vehicle, such as vehicle 10, is schematically illustrated. In FIG. 7, the powered window mechanism includes a powered window drive assembly 140 that is adapted to drive the movement of at least one window member 132, such as responsive to user inputs to a window actuator 134, such as may take the form of a user input device 102.

Powered window drive assembly 140 includes a window motor assembly 142, which includes at least one electric motor 144 that is adapted to drive movement of at least one window member 132. The window actuator is adapted to receive a user input directing a power source to actuate or otherwise energize the window motor assembly, such as to move the window member relative to the vehicle body. The window motor assembly includes an output 146 that is coupled to the window member to provide movement of the window member relative to the body of the vehicle. Although other constructions may be utilized, the output 146 from each of the one or more motors typically includes a rotating shaft and/or a rotation pinion or output gear. Output 146 may include more than one shaft, pinion, and/or gear, such as when window motor assembly 142 includes more than one motor.

Powered window drive assembly 140 may further include a battery assembly that is configured to selectively and independently energize the vehicle drive assembly and the window drive assembly. For example, the ride-on vehicle may include a window battery assembly 154 having one or more batteries 156, as shown in FIG. 7, to selectively energize the window motor assembly independently of the vehicle drive assembly and vehicle battery assembly 60. In some configurations, such as shown in FIG. 8, the window motor assembly may be powered by the same battery assembly 60 that is used to power the vehicle motor assembly. Although the powered window mechanism is shown with a battery-powered vehicle, the window mechanism may additionally or alternatively be configured for use with pedal-powered children's ride-on vehicles or other manually powered or manually propelled children's ride-on vehicles. Further, aspects of the disclosed window mechanism may be incorporated into a mechanical window opening device.

When present in a powered window mechanism, the window linkage may establish a fixed linkage between the output of the window motor assembly and the window member, such as by being secured to each of these components. It is also within the scope of the present disclosure that the window linkage, when present in such a powered window mechanism, may be releasably coupled between the output of the window motor assembly and the window member. By this it is meant that the window linkage may be selectively configured between an engaged configuration and a disengaged configuration. In the engaged configuration, the linkage couples the output of the window motor assembly and the window member together so that movement of the output results in movement of the window member. In the disengaged configuration, rotation or other movement of the output does not result in movement of the window member and/or the window member may move without a corresponding movement of the output.

When the window linkage is releasably coupled between the output of the motor assembly and the window member, the window linkage may be biased to maintain coupled motion of the output of the window motor assembly and the window member. This biasing may be accomplished with any suitable biasing mechanism or biasing member. In such a configuration, the window linkage may include, or be in communication with, an optional clutch assembly 152 that is adapted to selectively uncouple the output of the window motor assembly and the window member to permit relative movement of the motor output and the window member. As discussed, the clutch assembly may be configured to uncouple the output of the window motor assembly and the window member responsive to a force that is applied to the clutch assembly that exceeds a predetermined threshold.

FIG. 9 somewhat schematically depicts an illustrative, non-exclusive example of a window mechanism 130 in which a window member 132 is selectively movable relative to the vehicle body 12, such as through opening 136 in the body of the ride-on vehicle. The window member may extend at least partially through the opening at all times, however, it is also within the scope of the present disclosure that the window member may be selectively withdrawn from the opening, such as to extend completely within the body of the ride-on.

As previously discussed, the window mechanism may include a window drive assembly 140 that drives movement of the window member in response to a user input, such as to window actuator 134. When present in the form of a powered window drive assembly 140, the drive assembly may include a window motor assembly 142 that is energized selectively responsive to user inputs to window actuator 134. The output of the motor assembly may be coupled to the window member by a window linkage 150. A window battery assembly 154 may be provided to energize the window motor assembly independently of the vehicle drive assembly and battery assembly 60. While the above-discussed components of a powered window mechanism have been illustrated in dashed lines in FIG. 9, it should be appreciated that the window mechanism may alternatively be a manual window mechanism.

As illustrated in FIG. 9, the window member may include one or more receiving regions 160 that are adapted to couple the window member with the window linkage, or to otherwise retain the window member in a particular configuration. The window linkage may be configured to sequentially engage segments of the one or more receiving regions. In some configurations, the window member further includes a second receiving region that is spaced apart from the first receiving region, with the first and second receiving regions extending parallel to a path of travel 162 of the window member. The window member may be configured to move horizontally, vertically, and/or rotate relative to the vehicle body 12, such as responsive to actuation of the window motor assembly.

Window mechanism 130 may include one or more window support assemblies 170 that guide movement of the window member, maintain the orientation of the window member relative to the body, and/or conceal one or more of the window mechanism components. For example, window support assembly 170 may support one or more edges of the window member, may conceal receiving regions 160, and/or may maintain the orientation of the window member relative to body 12, such as when only a single receiving region is used to move the window member.

FIG. 10 depicts an illustrative, non-exclusive example of a window mechanism 130 in which a window member 132 is configured for manual movement relative to the vehicle body 12, such as through opening 136. Such a manually actuated embodiment of window mechanism 130 may be referred to as a manual window mechanism. As discussed, the manual window mechanism may, but is not required to, include a manual window drive assembly and/or a window linkage. When present, the manual window drive assembly and/or window linkage may assist with movement and/or maintaining a user-selected position of the window member in response to a user input to the window mechanism's window actuator. For example, a user may maneuver the window member using a handle or other window actuator associated with a manual window drive assembly. Alternatively, or additionally, a user may maneuver the window member using a window actuator handle and/or lever that extends from, or is otherwise suitably coupled to, the window member. This latter example also includes a user grasping the window member directly and urging the window member (such as by pulling or pushing upon the window member) to move relative to opening 136. In the example of FIG. 9, the manual window mechanism is shown including an illustrative, non-exclusive example of a window linkage 150 that is adapted to transmit user inputs to the window member and/or to retain the window member in a user selected configuration, such as an extended, or raised, configuration.

As illustrated in FIG. 10, the window member includes one or more receiving regions 160 that are adapted to couple the window member with the window linkage. The receiving regions include a plurality of spaced-apart segments 180 that take the form of ribs or teeth 210, such as along a ribbed plate or toothed rack, as is used for rack and pinion systems. The ribs may be integrally formed with the window member or may be coupled to the window member using any suitable fastener, including, but not limited to, screws, glues, tapes, clips, and the like. In some configurations, the receiving regions may include apertures or perforated or toothed belts that operatively couple the window member with the window linkage.

Window linkage 150 includes a coupling assembly 194 configured to engage with the receiving region and maintain the window member in a user-selected position relative to the body 12. The coupling assembly may be selectively mounted to the body or may be integrally formed with the body. As illustrated in FIG. 11, the coupling assembly includes a bearing 196 that is biased to engage the receiving regions, such as by a spring 198. The coupling assembly may be configured or may include additional components, such as bumpers or guides, to maintain suitable clearance between the sides of the window member and the body.

The window member may include protrusions, or stops, 208 that may limit movement of the window member relative to the vehicle body 12. In the illustrative example of FIG. 10, the window member may include a protrusion on the top and a protrusion on the bottom of the window member to limit movement of the window member relative to the body, such as to prevent a user from pulling the window member out of engagement with the body or pushing the window member out of reach within the body. The protrusion at the top of the window member may function as a handle to maneuver the window member relative to the vehicle body.

Another illustrative, non-exclusive example of a manual window mechanism 130 is shown in FIG. 12. As shown, the portions of the ride-on vehicle's body 12 that define opening 136 therebetween include opposed retainers 230 that engage opposed sides of window member 132, at least when the window member extends through the opening. As discussed, in some embodiments of window mechanisms 130 according to the present disclosure, at least a portion of the window member always extends through the opening, whereas in other embodiments, the window member may be selectively withdrawn entirely within the body of the ride-on. Retainers 230 are spaced sufficiently close together to engage and support the window assembly in a user-selected position when the window assembly extends through the opening. In other words, the retainers are constructed so that they automatically retain the window assembly in the user-selected extended position, at least until the user urges the window member to a different user-selected position. Accordingly, at least one of the retainers may be constructed from a compressible and/or high-friction material to provide the desired supportive and retentive forces to the window assembly. The retainers may engage any suitable opposed regions of the window member. The retainers may extend completely along the opening, may be present at only one discrete region of the opening, may be present at two or more spaced-apart regions along each side of the opening, etc. The above-discussed retainers may also be used with powered window mechanisms without departing from the scope of the present disclosure.

As illustrated in dashed lines in FIG. 12, the window member may include optional stops 208 that limit the degree to which the window member may be extended and/or withdrawn through opening 136. In a variant of the specific embodiment shown in FIG. 12, the spaced-apart retainers may be recessed or otherwise positioned within the body of the ride-on and thereby may be spaced-apart from opening 136. In such an embodiment, the opening may have a width that is larger, relative to the thickness of the window member than is illustrated in FIG. 12. The window mechanism of FIG. 12 may, but is not required to, include a window drive assembly.

FIG. 13 shows a portion of a children's ride-on vehicle 10 that includes an illustrative, non-exclusive example of a window mechanism 130, and more specifically, a manual window mechanism, according to the present disclosure. As shown, the window member 132 extends through opening 136 in the body 12 of the children's ride-on vehicle, such as proximate the passenger compartment 14 of the vehicle. The window member is selectively extended and retracted relative to the opening, and thus body 12, by a child grasping a window actuator 134 in the form of a handle, or tab, 234 that may project into the passenger compartment. The handle is connected to a spanning member 236 that physically interconnects the window actuator and the window member. In some embodiments, the spanning member may form a portion of the window member, in some embodiments, it may form a portion of a linkage assembly (150) that interconnects the window member and the window actuator, and in some embodiments, the spanning member may cooperate with a window drive assembly to convey to the window member the user-applied motive forces that are applied to the handle. As illustrated in the example of FIG. 13, the body of the ride-on vehicle defines a track, or slide, 238 that bounds the path of travel for handle 234, and thus window member 132.

In FIG. 13, window mechanism 130 includes optional window support assemblies 170 that may additionally or alternatively guide the path of travel of the window member and/or assist in maintaining the orientation of the window member relative to the body. As discussed, the window support assemblies, when present, may also house portions of the window mechanism. As an illustrative, non-exclusive example, window support assemblies 170 may house receiving regions 160 of the window member, such as may be used with the coupling assembly (194) of FIGS. 10 and 11. Additionally or alternatively, the window mechanism of FIG. 13 may utilize the retainers (230) of FIG. 12. Neither of these features are required, but either may be utilized as illustrative mechanisms to support and selectively retain the window member in a user-selected position relative to the body of the ride-on within a range of window positions.

FIG. 14 provides another illustrative, non-exclusive example of a window drive assembly for a manual window mechanism 130 according to the present disclosure. In FIG. 14, the manual window mechanism of FIG. 13 is shown, except that the spanning member and track of FIG. 13 are replaced by a manual window drive assembly 140 in the form of a rotary crank 244 with a window actuator 134 in the form of a handle, or lever, 246 that is positioned for access by a child sitting in the passenger compartment of the ride-on vehicle 10. As the child pivots the handle, and thus crank 244, in a clockwise or counterclockwise direction, these user-applied motive forces cause the window member to be selectively extended or withdrawn (or vice versa) relative to opening 136, and thus body 12. The output of the rotary crank is connected to the window member by any suitable mechanical interconnection, either directly, or via a suitable window linkage, such as those described, illustrated, and/or incorporated herein.

Essentially, the interconnection with the window member and/or the window linkage converts the rotary motion of the crank into a translational motion of the window member. As additional illustrative examples, the subsequently discussed powered window mechanisms illustrate a variety of suitable mechanisms for converting the rotational output of a motor into a translational movement of the window member. The same or similar mechanisms may be utilized with a rotary crank or other lever-actuated manual window drive assembly, such as the illustrative example shown in FIG. 14.

Figure 15:
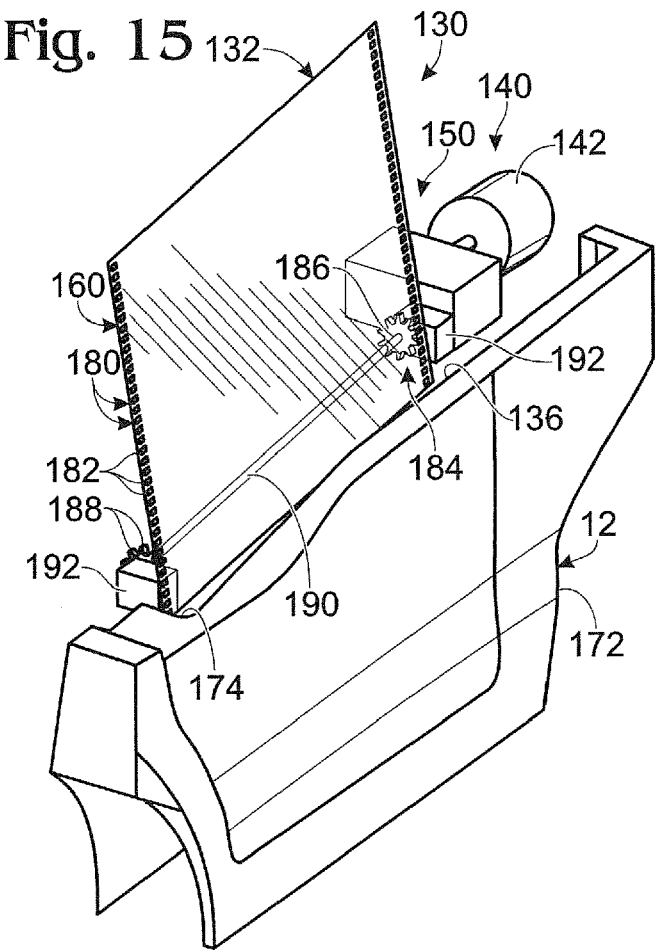
FIG. 15 is an exterior perspective view of an illustrative example of a powered window mechanism of a children's ride-on vehicle according to the present disclosure, in which the window member is moved relative to the vehicle body by gears.

In FIG. 15, an illustrative, non-exclusive example of a window mechanism 130 that includes a powered window drive assembly 140 is shown. Also shown in FIG. 15 is a portion of the body 12 of a children's ride-on vehicle, with the illustrated portion of the body including a door portion 172 in which opening 136 is formed. The window member is movable relative to a door portion, such as by moving vertically relative to the door portion. The door portion may include a door frame, such as which may be formed by one or more side supports, and in some embodiments may include an upper support. The door portion may be movable relative to the rest of the body or may be integrally formed with the body such that the door portion does not open. Window support assembly 170 may take the form of guide channels, or grooves, 174 within the door portion that wrap around the receiving regions and support the window member. The door portion may extend around the edges of the window member, such as to support the sides and top of the window member and/or conceal receiving regions 160 when the window member is in a closed position.

Figure 16:
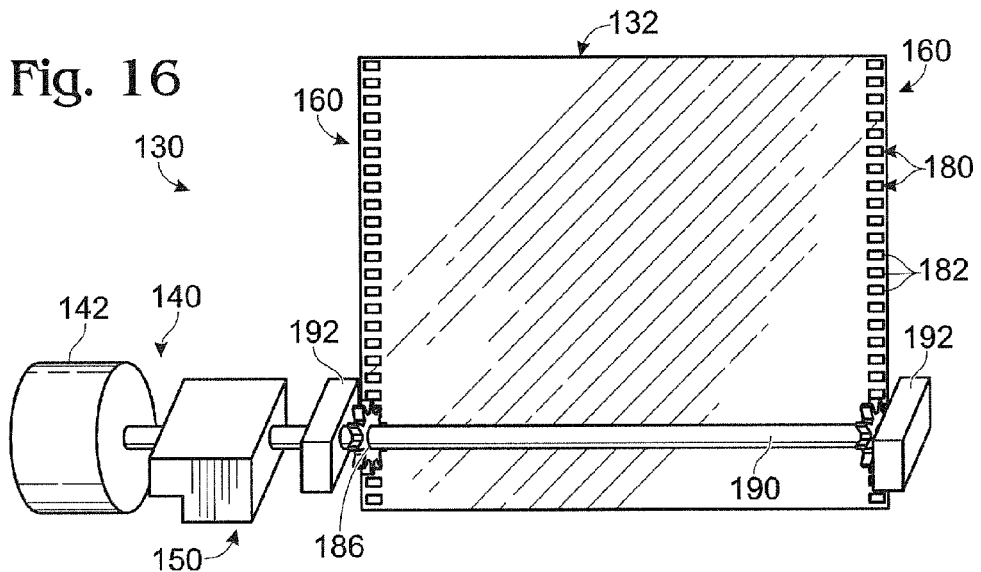
FIG. 16 is a fragmentary interior view of the powered window mechanism of FIG. 15.

In the illustrative, non-exclusive example shown in FIG. 15, the window motor assembly 142 is mounted on the interior of the vehicle's body 12 below opening 136. This relative mounting position is an illustrative example, and other positions may be used without departing from the scope of the present disclosure. Window motor assembly 142 is coupled to window linkage 150, which includes a gear assembly 184. The window member includes parallel receiving regions 160 on opposing edges of the window member. The receiving regions include a plurality of spaced-apart segments 180 that are configured to couple the window member with the window linkage. In the illustrative configuration of FIGS. 15 and 16, the segments take the form of apertures 182. As shown in FIG. 15, gear assembly 184 includes a pair of gears 186 having sprockets 188 that are adapted to engage the receiving regions and translate the window member relative to the body responsive to rotation of the gears. The sprocket gears are coupled to the motor assembly output by an axle 190. In such a configuration, the apertures are configured to sequentially receive the sprockets and translate the window member relative to the body responsive to rotation of the gears. Rotation of the sprockets in one direction will urge the window member to move generally away from the vehicle body, such as through opening 136, while rotation of the sprockets in the opposite direction will retract the window member toward the body. Powered window mechanism 130 may include additional components, such as one or more bearings 192. In the illustrative, non-exclusive example of a powered window mechanism of FIGS. 15 and 16, bearings 192 take the form of pillow block bearings, which may be mounted to body 12 to provide load support for axle 190.

Figure 17:
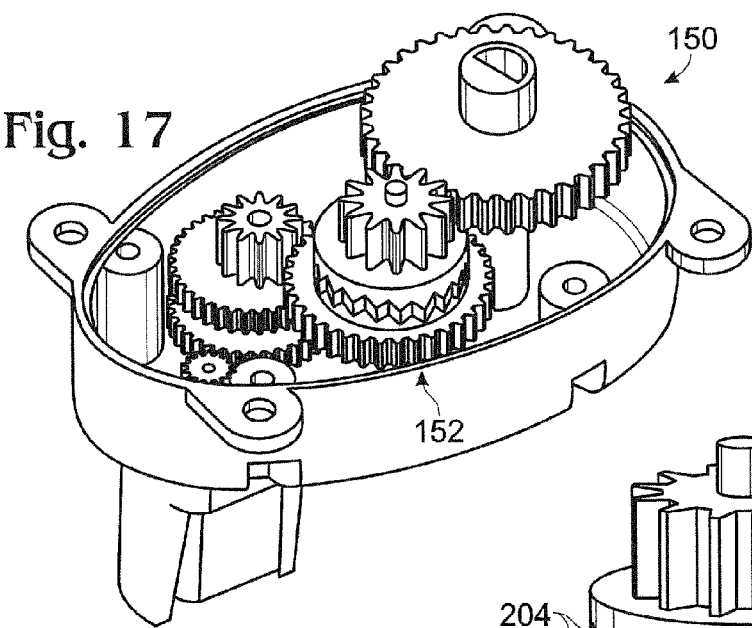
FIG. 17 is a perspective view of an illustrative example of a window linkage suitable for coupling of a window motor output and the window member, such as for the powered window mechanism of FIGS. 7-8 and 15-16.
Figure 18:
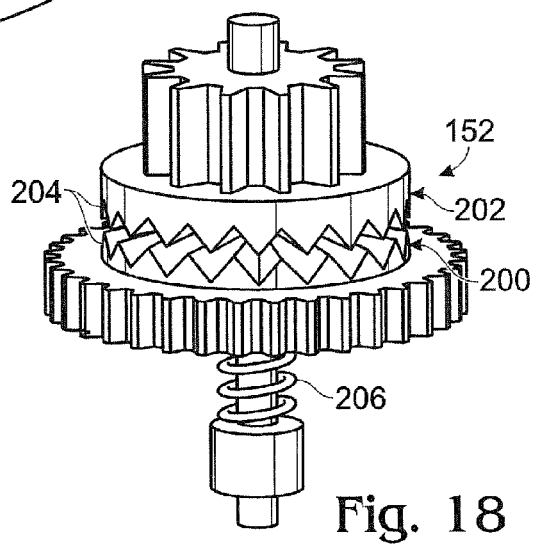
FIG. 18 is a perspective view of an illustrative example of a clutch assembly suitable for use with the window linkage of FIG. 17.

As previously discussed, the window linkage may be biased to maintain coupled motion of the output of the window motor assembly and the window member. In such a configuration, the window linkage may include clutch assembly 152 that is adapted to selectively uncouple the output of the window motor assembly and the window member to permit relative movement of the motor output and the window member, such as by converting rotation of the motor output to linear movement of the window member. For example, the window linkage 150, such as that of the illustrative linkage shown in FIGS. 15 and 16, may include clutch assembly 152. FIGS. 17 and 18 illustrate an illustrative, non-exclusive example of a suitable clutch assembly for use with the window linkage. As illustrated in FIG. 18, a first clutch member 200 engages a second clutch member 202 via protrusions 204, such as complimentary teeth on each clutch member. One or more of the clutch members may be biased to engage one another. For example, a biasing mechanism in the form of a spring 206 may urge the first clutch member to engage the second clutch member to maintain synchronized movement of the clutch members, and consequently the synchronized movement of the motor output and the window member. Other biasing members and/or mechanisms may be utilized. The clutch assembly may be configured to uncouple the output of the window motor assembly and the window member responsive to a force exceeding a predetermined threshold. For example, the first clutch member may compress the spring to disengage the first clutch member from the second clutch member in response to a force exceeding a predetermined threshold, such as a child pushing or pulling on the window member, or the window member being otherwise obstructed.

Figure 19:
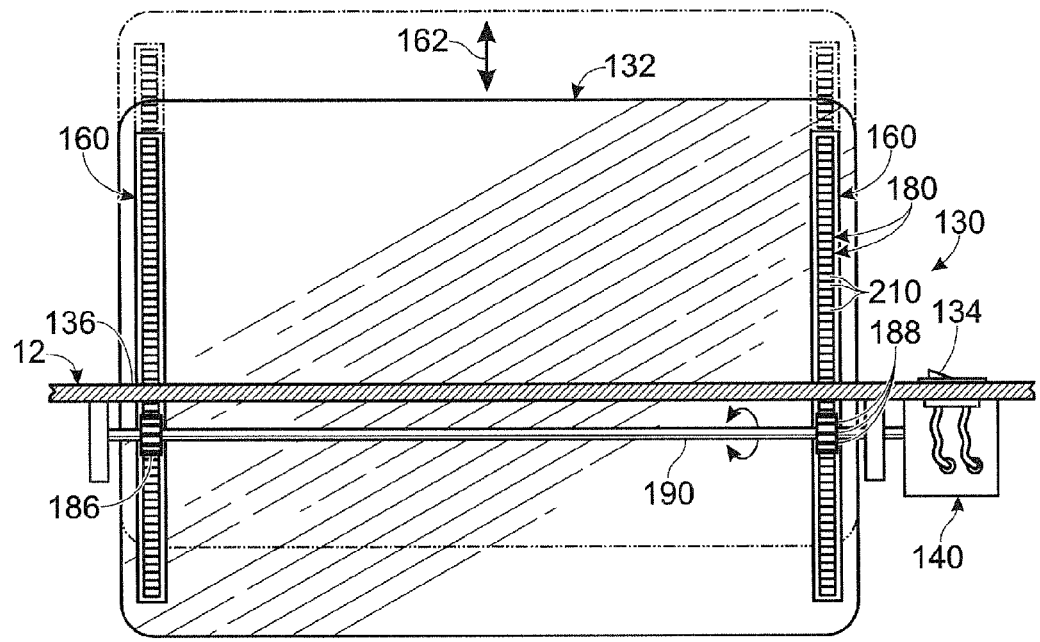
FIG. 19 is an interior view of another illustrative example of a powered window mechanism of a children's ride-on vehicle according to the present disclosure, in which the window member is moved by a rack and pinion system between a closed position and an open position.

FIG. 19 illustrates another illustrative, non-exclusive example of a powered window mechanism 130 according to the present disclosure. As depicted, body 12 includes an opening 136, such as in a door portion. A pair of receiving regions 160 extend along opposing sides of the window member 132. A window drive assembly 140 is mounted to the body, such as to a door frame, with a window actuator 134, such as a toggle switch, adjacent the opening. The window drive assembly includes a window linkage with a pair of gears 186 that are rotated by axle 190. The gears include sprockets 188 that may be configured to engage the receiving regions and translate the window member relative to the body responsive to rotation of the gear. In such a configuration, the receiving region includes a plurality of spaced-apart segments 180 that are configured to sequentially engage with the sprockets and translate the window member relative to the body responsive to rotation of the gear. As shown, the segments may take the faun of ribs or teeth 210, such as along a ribbed plate or toothed rack as is used for rack and pinion systems. Ribs 210 may be integrally formed with the window member or may be coupled to the window member using any suitable fastener, including, but not limited to, screws, glues, tapes, clips, and the like. In some configurations, the receiving regions may be perforated or toothed belts that operatively couple the window member and the gears.

Figure 21:
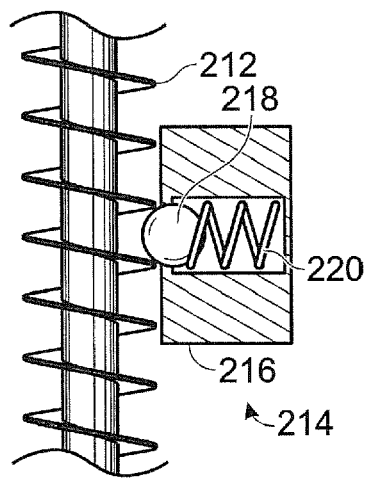
FIG. 21 is a side view of an illustrative example of a clutch assembly suitable for use with the powered window mechanism of FIG. 20 in which a bearing assembly is biased to engage the threads of the shaft.
Figure 20:
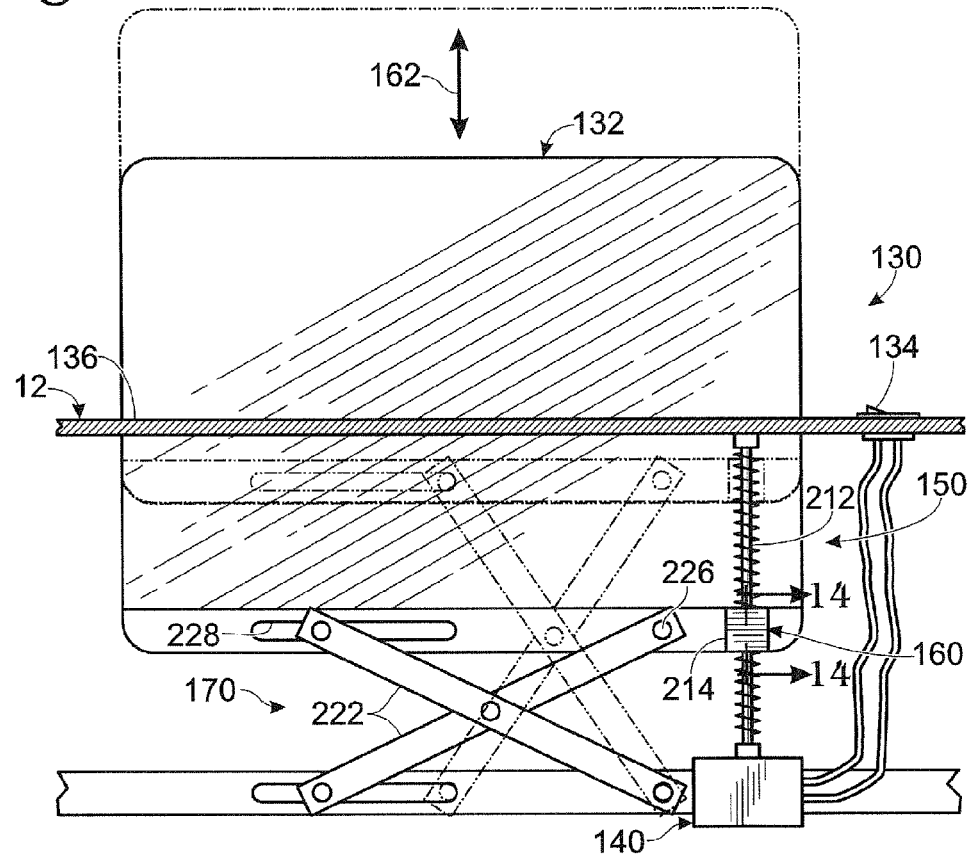
FIG. 20 is an interior view of another illustrative example of a powered window mechanism of a children's ride-on vehicle according to the present disclosure, in which the window member is moved relative to the vehicle body by a threaded shaft.

FIG. 20 illustrates another illustrative, non-exclusive example of a powered window mechanism 130. As depicted, the window linkage 150 includes a threaded shaft 212, such as a worm gear. The receiving region 160 of the window member includes a bearing assembly 214 configured to engage with and translate relative to the threaded shaft and thereby translate the window member relative to the body responsive to rotation of the threaded shaft. The bearing assembly may be selectively coupled to the window member or may be integrally formed with the window member. FIG. 21 illustrates an exemplary bearing assembly 214 suitable for use with the powered window mechanism of FIG. 20. As depicted, the bearing assembly includes a housing 216 and a bearing 218 that is biased to engage the threaded shaft, such as by a spring 220. The spring biases the bearing to maintain contact with the threads of shaft 212. The housing is coupled to the window member, such as at the bottom or back side of the window member, and may extend around the threaded shaft or may engage a side portion of the threaded shaft, such as in the exemplary configuration of FIG. 21.

FIG. 20 further illustrates an illustrative, non-exclusive example of a window support assembly 170 that is adapted to maintain the window member in a predetermined orientation relative to the body. For example, the window support assembly may include one or more rotatable members 222 having a first end coupled to the body and a second end coupled to the window member. To support the rotatable members, one end may be coupled in a fixed location, such as by a pin joint 226, while the second end is movably coupled, such as by a pin and slot 228. As the window member is moved between an open, or raised, position and a closed, or lowered, position, the rotatable members provide structural support to maintain the window member in a predetermined orientation, such as may be desirable when a single window drive assembly is associated with the window member and offset from the center of the window member. The window support assembly may further include guide channels 174, as previously described, to support the sides of the window member.

Figure 22:
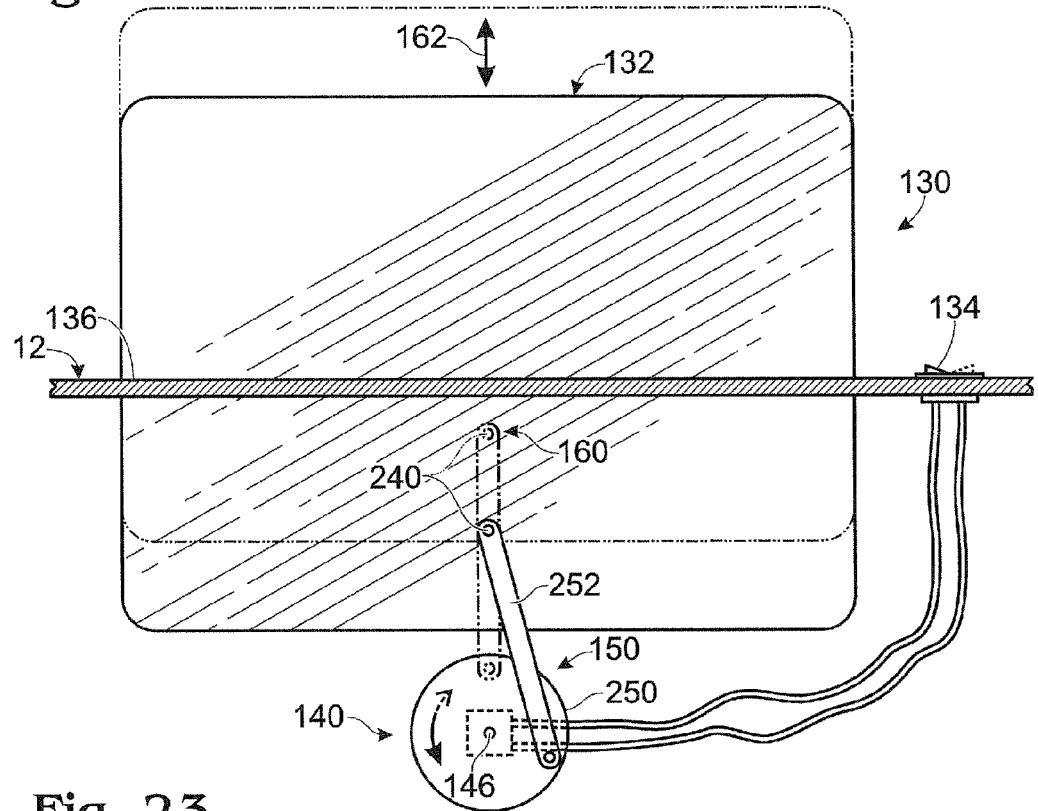
FIG. 22 is an interior view of another illustrative example of a powered window mechanism of a children's ride-on vehicle according to the present disclosure, in which the window member is moved relative to the vehicle body by a rotating disk.

Another illustrative, non-exclusive example of a powered window mechanism 130 according to the present disclosure is shown in FIG. 22. The window drive assembly 140 may be mounted on the interior of the vehicle's body 12 below opening 136. This relative mounting position is an illustrative example, and other positions may be used without departing from the scope of the present disclosure. The window motor assembly output 146 may be coupled to the window member by a window linkage 150. As depicted, the window member may include one or more receiving regions 160 that are adapted to couple the window member 132 with the window linkage. For example, the receiving region may take the form of a pin joint 240 or other suitable component(s) configured to permit relative rotation with the window linkage. The window linkage may include a rotating member, such as is illustrated in the form of a disk, 250 and a transmission member 252, such as a rod, that couple the motor output with the window member. The transmission member may be coupled to the disk or other rotating member using any suitable mechanism, including, but not limited to, frictionless components, bearings, pin joints, hinges, and the like.

As shown, the motor output 146 rotates the disk 250 to move the transmission member 252 such that one end of the rod moves along a path defined by the rotational movement of the disk (or other rotating member) and where this end is coupled to the disk, while the opposing end of the rod urges the window member to move relative to the vehicle body along the path of travel 162. As illustrated in FIG. 22, the rotational movement of disk 250 causes the window member to sequentially be raised and lowered (or otherwise reciprocated) along its path of travel. In such a configuration, the window motor assembly may include one or more single-direction motors, as the rotation of the motor (and/or its motor output) does not need to be reversed to cause the window to reverse its direction of movement. However, it is also within the scope of the present disclosure that a reversible motor may be used, as reversing the direction or rotation of the motor and/or its motor output may also be used to cause the window member to reverse its movement along its path of travel. This optional use of a reversible motor is indicated in dashed lines in FIG. 22.

The open, or raised, and the closed, or lowered, positions of the window member may be achieved without significant user precision in operating the window actuator 134. A child may therefore alter the position of the window member by manipulating the actuator in a single manner, such as by depressing a button for a given time period, rather than manipulating an actuator having multiple positions, such as up, down, and neutral/stop. The powered window mechanism may include a window support assembly, as previously described, as is necessary or desired to support and maintain the orientation of the window member 132. The window linkage may include a clutch assembly that is adapted to selectively uncouple the output of the window motor assembly and the window member to permit relative movement of the motor output and the window member. For example, a clutch assembly may be configured to uncouple the output of the window motor assembly and the disk or window member responsive to a force exceeding a predetermined threshold.

Figure 23:
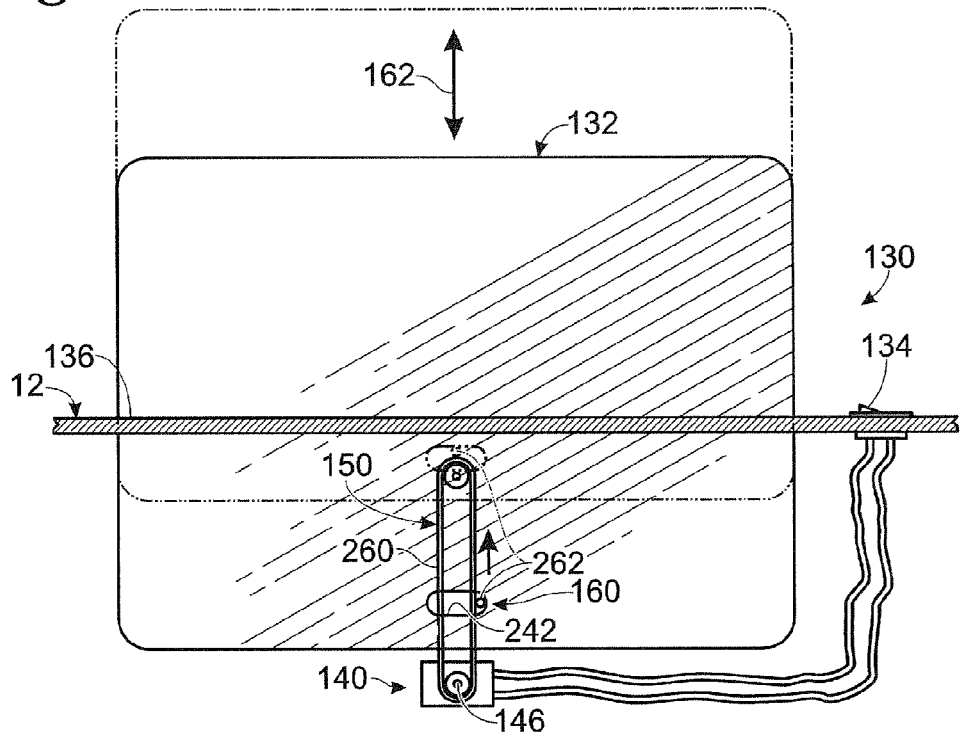
FIG. 23 is an interior view of another illustrative example of a powered window mechanism of a children's ride-on vehicle according to the present disclosure, in which the window member is moved relative to the vehicle by a belt.

FIG. 23 depicts another illustrative, non-exclusive example of a powered window mechanism 130 according to the present disclosure. The powered window mechanism shown in FIG. 23 provides another example of a powered window mechanism that may be driven with a reversible motor or with a single-direction motor and yet still drive the window member to move in a reciprocating manner along its path of travel. Similar to the preceding embodiment, the window drive assembly 140 may be mounted on the interior of the vehicle's body 12 below opening 136, although other positions may be used without departing from the scope of the present disclosure. The window motor assembly output 146 may be coupled to the window member by a window linkage 150. As illustrated, the window member may include one or more receiving regions 160 that are adapted to couple the window member with the window linkage. For example, the receiving region may take the form of an elongate slot 242 or other suitable engagement region that is configured to receive a portion of the window linkage. As another illustrative example, the receiving region may take the form of an elongate track, channel, or race.

The window linkage may include a belt 260 that couples the rotation of the motor output with the window member to translate the rotational movement of the motor output to reciprocating movement of the window member along path of travel 162. The belt may be formed of any suitable material, may be rigid or elastic, and may be formed from a single length of material or may be formed from a plurality of interconnected links or segments. As shown, the belt may include a protrusion 262 that projects or otherwise extends from the belt and is configured to engage the slot and thereby urge the window member between the open and closed positions. Protrusion 262 may take any suitable form for engaging with the engagement region of the window member in a manner that permits the protrusion to move in a reciprocating path relative to the engagement region, while remaining coupled to the engagement region, as the belt is rotated by the window motor assembly. The protrusion may extend into or through the slot or other engagement region or otherwise be coupled thereto to provide the above-discussed movement.

For example, in the version shown in FIG. 23, the protrusion may engage the right side of the slot as the belt is rotated counter-clockwise to move the window member to a closed position. Upon reaching the closed position (i.e., the highest point of the belt), the protrusion moves to the left side of the slot and urges the window member towards the open position by pressing down on the lower edge of the slot. In the illustrated embodiment, the relative movement of the protrusion in a direction that is generally transverse to the path of travel of the window member provides a period in which the window motor assembly is driving the rotation of belt 260 and yet the window member is not being urged along its path of travel. Such a construction may permit a child to more easily position the window member in its open or closed position without having to carefully stop the rotation of the window motor assembly at a precise time.

As discussed, the window motor assembly may include one or more single-direction motors. Optionally, a reversible motor also may be used to drive the movement of the window member along its path of travel. The powered window mechanism may include a window support assembly, as previously described, as is necessary or desirable to support and maintain the orientation of the window member 132. The window linkage may include a clutch assembly adapted to selectively uncouple the output of the window motor assembly and the window member to permit relative movement of the motor output and the window member.

For simplicity of the figures and discussion, many of the above-described and illustrated window mechanisms have been designated as being manual window mechanisms or powered window mechanisms. However, it is within the scope of the present disclosure that components that have been illustrated in connection with one of the illustrated window mechanisms may be used with other window mechanisms without departing from the scope of the present disclosure. As illustrative, non-exclusive examples, the retainers and stops that were discussed in the context of manual window mechanisms may be utilized with powered window mechanisms. As further illustrative, non-exclusive examples, the window linkages (and/or clutches) that have been illustrated in connection with the output of the motor assembly of a powered window drive assembly, may also be used with a manual window drive assembly, such as one that includes a manual crank or gear with an output to which the window linkage is coupled.

It should be appreciated that the window mechanisms disclosed herein may take any suitable configuration. For example, the window drive assembly may be mounted to either the body or the window member. Further, the window mechanism may be configured to operate the window along any suitable path of travel. While illustrative examples of ride-on vehicles with window mechanisms according to the present disclosure have been illustrated and described herein, the window mechanisms may take a wide variety of other forms, as desired or beneficial for a particular application, without departing from the scope of the present disclosure.

INDUSTRIAL APPLICABILITY

The present disclosure is applicable to children's ride-on vehicles.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations of features, functions, elements and/or properties that may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A children's ride-on vehicle, comprising:
a reduced-scale body having a seat sized for a child;
a window member configured to move relative to the body and including a bearing assembly; and
a window drive assembly coupled to the body and configured to selectively drive movement of the window member relative to the body between a closed position and an open position, the window drive assembly comprising:
a window linkage configured to retain the window in a user-selected configuration, wherein the window linkage includes a threaded shaft engaged with the bearing assembly, wherein when the threaded shaft rotates in a first direction, the window member translates toward the closed position, and when the threaded shaft rotates in a second direction that is opposite the first direction, the window member translates toward the open position.

2. The children's ride-on vehicle of claim 1, further comprising:
a window support assembly coupled to the body and the window member, wherein the window support assembly includes one or more rotatable members, with each rotatable member having a first end coupled to the body and a second end coupled to the window member, wherein one of the first end and the second end is fixedly and pivotally coupled to one of the body and the window member and the other of the first end and the second end is movably and pivotally coupled to the other of the body and the window member.

3. The children's ride-on vehicle of claim 1, further comprising:
a window support assembly coupled to the body and the window member, wherein the window support assembly includes two elongate members that define a scissorlike arrangement, wherein opposing ends of each elongate member are coupled to the body and the window member, respectively.

4. The children's ride-on vehicle of claim 1, further comprising:
a window support assembly coupled to the body and the window member, wherein the window support assembly includes two elongate members that are pivotally coupled to each other in an X-arrangement, wherein when the window member translates toward the closed position, the X-arrangement increases in height and decreases in width, and when the window member translates toward the open position, the X-arrangement decreases in height and increases in width.

5. The children's ride-on vehicle of claim 1, wherein the window member defines a window member slot and the body defines a body slot, the children's ride-on vehicle further comprising:
a window support assembly configured to maintain the window member in a predetermined orientation relative to the body, wherein the window support assembly includes:
a first rotatable member having a first end pivotally coupled to the body and a second end slidingly coupled to the window member slot; and
a second rotatable member having a first end pivotally coupled to the window member and a second end slidingly coupled to the body slot;
wherein when the window member translates toward the closed position, the second end of the first rotatable member translates toward the first end of the second rotatable member and the second end of the second rotatable member translates toward the first end of the first rotatable member; and
wherein when the window member translates toward the open position, the second end of the first rotatable member translates away from the first end of the second rotatable member and the second end of the second rotatable member translates away from the first end of the first rotatable member.

6. The children's ride-on vehicle of claim 5, wherein the first rotatable member and the second rotatable member are pivotally coupled to each other.

7. The children's ride-on vehicle of claim 5, wherein the first rotatable member and the second rotatable member are pivotally coupled to each other at their respective mid-points.

8. The children's ride-on vehicle of claim 1,
wherein the window drive assembly further comprises:
an electric window motor having an output that is operatively coupled to the threaded shaft; and
a window battery configured to power the electric window motor.

9. The children's ride-on vehicle of claim 8, wherein the window drive assembly further comprises a clutch assembly configured to selectively uncouple the output of the window motor and the window member to permit relative movement of the output and the window member.

10. The children's ride-on vehicle of claim 9, wherein the clutch assembly is configured to uncouple the output of the window motor and the window member responsive to a force exceeding a predetermined threshold.

11. The children's ride-on vehicle of claim 8, further comprising:
a plurality of wheels rotatably coupled to the body and including at least one driven wheel;
a vehicle drive assembly configured to selectively drive the rotation of the at least one driven wheel, the vehicle drive assembly comprising:
a vehicle motor;
a vehicle battery configured to power the vehicle motor, wherein the vehicle battery is not the window battery; and
a first user input device positioned to receive inputs from a child sitting on the seat and configured to selectively actuate the vehicle motor responsive to the inputs to the first user input device;
wherein the window drive assembly further includes a second user input device positioned to receive inputs from a child sitting on the seat and configured to selectively actuate the window motor responsive to inputs to the second user input device.

12. The children's ride-on vehicle of claim 1, further comprising:
a plurality of wheels rotatably coupled to the body and including at least one steerable wheel and at least one driven wheel;
a steering assembly comprising a steering mechanism configured to receive steering inputs from a child sitting on the seat, and a steering linkage configured to convey the steering inputs to the at least one steerable wheel; and
a vehicle drive assembly configured to selectively drive the rotation of the at least one driven wheel.

13. The children's ride-on vehicle of claim 12,
wherein the vehicle drive assembly comprises:
a vehicle motor assembly comprising at least one electric motor;
a vehicle battery assembly comprising at least one battery configured to power the vehicle motor assembly; and
a user input device positioned to receive inputs from a child sitting on the seat and configured to selectively actuate the vehicle motor assembly responsive to the inputs to the user input device from a child sitting on the seat.

14. The children's ride-on vehicle of claim 1, further comprising a window support assembly configured to maintain the window member in a predetermined orientation relative to the body.

15. The children's ride-on vehicle of claim 1, wherein the body defines an opening and the window member extends through the opening.

16. The children's ride-on vehicle of claim 15, wherein the body includes a door portion and the door portion defines the opening.

17. The children's ride-on vehicle of claim 1, wherein the body does not have a compartment sized to receive an adult.

18. A children's ride-on vehicle, comprising:
a body having a seat sized for a child and not having a compartment sized to receive an adult;
a window member configured to move relative to the body between an open position and a closed position;
a window support assembly coupled to the body and the window member, wherein the window support assembly includes two elongate members that are pivotally coupled to each other in an X-arrangement, wherein when the window member translates toward the closed position, the X-arrangement increases in height and decreases in width, and when the window member translates toward the open position, the X-arrangement decreases in height and increases in width; and
a window drive assembly coupled to the body and configured to selectively drive movement of the window member relative to the body between a closed position and an open position, the window drive assembly comprising a window linkage configured to retain the window in a user-selected configuration, wherein the window linkage includes a vertically-oriented threaded shaft, wherein when the threaded shaft rotates in a first direction, the window member translates toward the closed position, and when the threaded shaft rotates in a second direction that is opposite the first direction, the window member translates toward the open position.

19. A children's ride-on vehicle, comprising:
a reduced-scale body having a rider compartment with a seat sized for a child, wherein the body includes a slot and a window member configured to move relative to the body between an open position and a closed position, wherein in the closed position, at least a portion of the window member extends from the body through the opening proximate the rider compartment, and further wherein in the open position some of the portion of the window member that extended through the slot in the closed position is instead positioned within the body;
a plurality of wheels rotatably coupled to the body and including at least one steerable wheel and at least one driven wheel;
a steering assembly comprising a steering mechanism configured to receive steering inputs from a child sitting on the seat, and a steering linkage configured to convey the steering inputs to the at least one steerable wheel;
a vehicle drive assembly configured to selectively drive the rotation of the at least one driven wheel, wherein the vehicle drive assembly comprises:
a vehicle motor assembly comprising at least one electric motor;
a vehicle battery assembly comprising at least one battery configured to power the vehicle motor assembly; and
a first user input device positioned to receive inputs from a child sitting on the seat and configured to selectively actuate the vehicle motor assembly responsive to the inputs to the first user input device from a child sitting on the seat;

a bearing assembly coupled to the window member; and a window drive assembly configured to selectively drive movement of the window member relative to the body, the window drive assembly comprising:

a window motor assembly comprising at least one electric motor having an output;

a window linkage configured to couple the output of the window motor assembly to the window member, wherein responsive to actuation of the window motor assembly, the window drive assembly is configured to translate the window member between the open position and the closed position, wherein the window linkage includes a threaded shaft engaged with the bearing assembly, wherein when the threaded shaft rotates in a first direction, the window member translates toward the closed position, and when the threaded shaft rotates in a second direction that is opposite the first direction, the window member translates toward the open position; and a second user input device positioned to receive inputs from a child sitting on the seat and configured to selectively actuate the window motor assembly responsive to the inputs to the second user input device from the child sitting on the seat.

20. The children's ride-on vehicle of claim 19, wherein the threaded shaft is oriented vertically when the children's ride-on vehicle is positioned on a horizontal surface.

* * * * *